United States Patent [19]

Morris

[11] 4,004,656

[45] Jan. 25, 1977

[54] MULTI-BRAKE SHOE MEANS FOR A MULTI-BRAKING SURFACE BRAKED ASSEMBLY

[75] Inventor: Robert B. Morris, North Huntingdon, Pa.

[73] Assignee: Westinghouse Air Brake Company, Wilmerding, Pa.

[22] Filed: June 17, 1975

[21] Appl. No.: 587,600

[52] U.S. Cl. .................... 188/52; 188/217; 188/220.1

[51] Int. Cl.² .................... B61H 13/00

[58] Field of Search ............ 188/217, 79, 325, 33, 188/264 R, 52, 53, 107, 153 R, 204 R, 220.1, 238, 219.6, 219.1, 106 F

[56] References Cited

UNITED STATES PATENTS

| 1,490,642 | 4/1924 | Smith | 188/204 R X |
|---|---|---|---|
| 1,924,622 | 8/1933 | Norton | 188/264 R |
| 1,935,331 | 11/1933 | Norton | 188/264 R |
| 2,042,445 | 5/1936 | Eksergian | 188/79 |
| 2,191,821 | 2/1940 | Down | 188/238 X |
| 2,413,614 | 12/1946 | Eksergian | 188/153 R |
| 2,418,435 | 4/1947 | Tack | 188/33 |
| 2,422,004 | 6/1947 | Flesch | 188/52 |
| 2,958,398 | 11/1960 | Newell | 188/52 |
| 3,088,550 | 5/1963 | Kirk | 188/52 |
| 3,407,907 | 10/1968 | 188 | 106 F X/ |
| 3,536,168 | 10/1970 | Newstead | 188/79 |

*Primary Examiner*—Trygve M. Blix
*Assistant Examiner*—Douglas C. Butler
*Attorney, Agent, or Firm*—W. F. Poore; R. W. McIntire, Jr.

[57] ABSTRACT

A braking apparatus wherein the heat absorbing mass of a rotating braked element, such as a vehicle wheel, is increased by securing to such as each wheel of a vehicle, a brake drum, the peripheries of the wheels and drums constituting braking surfaces against which a plurality of brake shoes are pressed during a brake application by a movable member between which and the brake shoes there is interposed a mechanism that provides for shifting of the brake shoes relative to the movable member in such a manner as to enable each brake shoe to transmit substantially the same braking force to the corresponding braking surface notwithstanding the rate of wear of one shoe exceeding that of another.

14 Claims, 2 Drawing Figures

MULTI-BRAKE SHOE MEANS FOR A MULTI-BRAKING SURFACE BRAKED ASSEMBLY

BACKGROUND OF THE INVENTION

In the American Society of Mechanical Engineers paper 72-WA/RT-10 titled "The Effect of Wheel Diameter on Tread Temperature in Grade Operation" by G. M. Cabble, it is shown that as the brake horsepower per railway vehicle wheel is increased, the temperature rise of the wheel is increased, given the same time. During a brake application, the mechanical energy of the brake horsepower applied to the wheel is converted to heat energy which is stored in and dissipated from the mass that constitutes the rotating wheel. Therefore, it is apparent that an increase in the mass of the wheel, and thus a corresponding increase in its heat sink capability, would effect a reduction in the maximum temperature attained by the wheel for a given brake horsepower applied thereto during a brake application.

Accordingly, it is the general purpose of this invention to provide a novel brake apparatus wherein the mass, and therefore, the heat sink, of a railway vehicle wheel is increased by securing a brake drum to the side of the wheel, or the axle on which the wheel is mounted, and applying a braking force from a movable member to the braking surfaces constituted by the peripheries of both the wheel and the drum via a multi-brake shoe means that comprises a plurality of brake shoes between each pair of which and the movable member there is interposed a mechanism that includes either a lever pivoted intermediate its ends on the movable member with its ends in abutting relationship with the corresponding pair of brake shoes or a plurality of encased spherical members whereby, upon movement of the movable member in the direction of the wheel and brake drum, these brake shoes transmit substantially equal braking forces to the peripheral braking surfaces on the wheel and drum notwithstanding the rate of wear of one brake shoe exceeding that of the other.

SUMMARY OF THE INVENTION

According to the present invention, the mass, and therefore the heat sink, of a railway vehicle wheel is increased by the addition of a brake drum suitably secured to the side of the wheel, or pressed on the axle of the wheel, the respective peripheries of the wheel and drum providing braking surfaces for a pair of brake shoes that are in abutting relationship with the opposite ends of an equalizing lever which is pivotally mounted on a member, such as a brake beam, that may be moved in the direction of the wheel to bring the brake shoes into braking contact with these braking surfaces.

DESCRIPTION — FIG. 1

Figure 1:
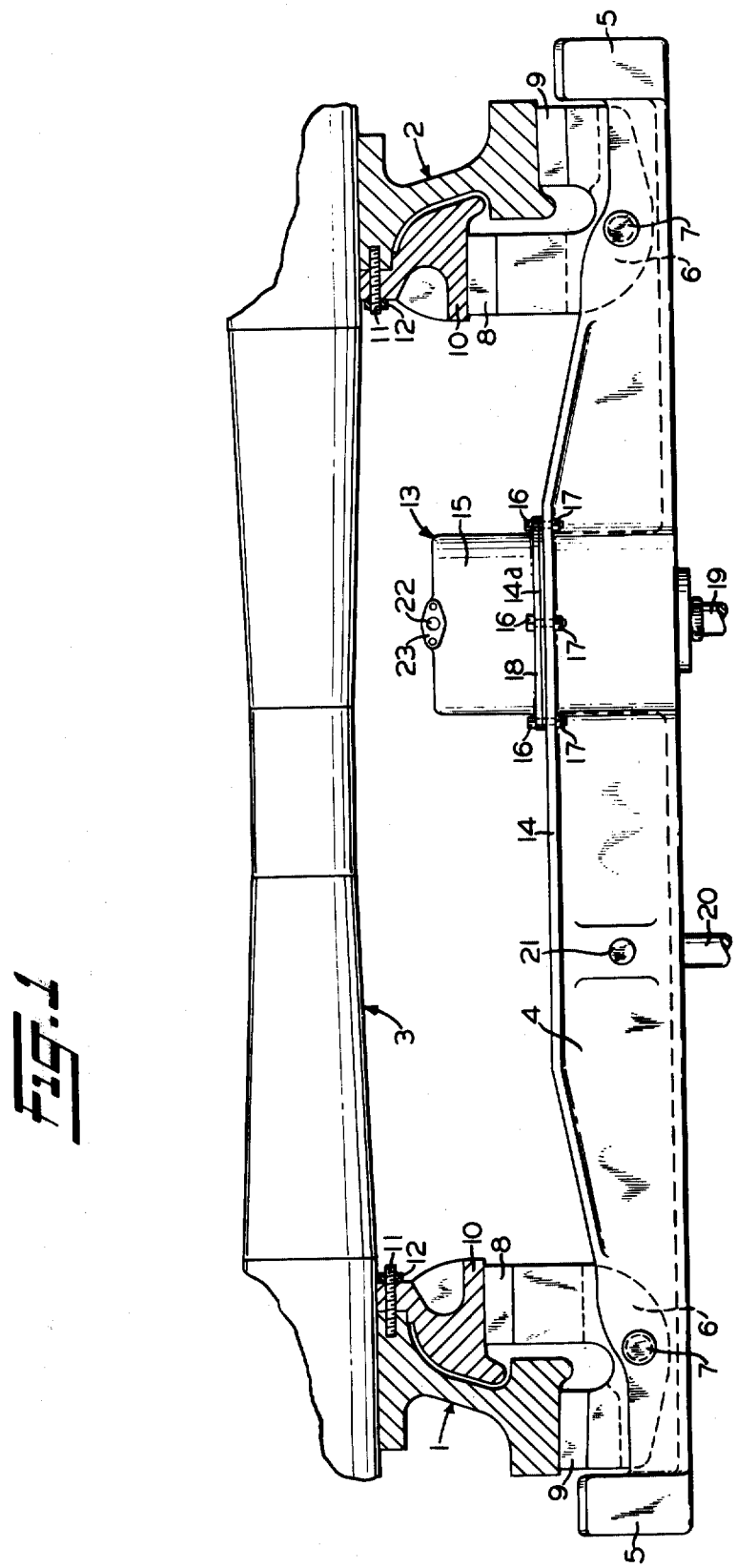
FIG. 1 is a plan or top view, partly in section, of a novel brake apparatus which embodies one form of the invention showing the manner by which two pair of brake shoes are pivotally mounted on a brake beam, each pair of brake shoes being movable into braking engagement with the respective peripheries of a wheel and a brake drum carried thereby.

Referring to FIG. 1 of the drawings, the reference numerals 1 and 2 designate respectively the wheels secured at opposite ends of an axle 3 which may constitute one axle of a two-axle four-wheel railway vehicle truck.

The tread of the wheels 1 and 2 forms a peripheral annular braking surface thereby enabling the mass of the respective wheel to constitute a heat sink in which heat energy may be stored and from which heat may be dissipated by radiation as the wheel rotates at a high speed as a railway vehicle travels along a track.

A brake beam 4 may comprise one of a pair of brake beams of a brake rigging for a two-axle four-wheel railway vehicle truck such as, for example, the brake rigging shown and described in U.S. Pat. No. 2,958,398 issued Nov. 1, 1960 to George K. Newell, and assigned to the assignee of the present invention. This pair of brake beams is symmetrically arranged on opposite sides of a truck bolster (not shown) and are movably supported at each end on the side frame members (not shown) of the railway vehicle truck.

The brake beam 4 may be in the form of a casting that in cross section has the shape of a standard channel, such as a U-channel, this channel having an upper and a lower flange which is connected by a web that is integral therewith. At each end of the brake beam 4, a guide foot 5, in the form of a flat L-shaped member, has one leg thereof cast integral with the flanges at this end of the brake beam.

The other leg of each guide foot 5 is slidably supported in a grooved wear plate and guide member (not shown), this wear plate and guide member being secured to a truck side frame (not shown). The wear plate and guide members and guide feet serve to support the brake beam 4 at the proper height above the rails, (that is somewhat below the horizontal diameter of the wheels) the groove in the wear plate and guide members being at a slight angle to the horizontal to permit bodily movement of the brake beam 4 in a direction radially of the associated wheels 1 and 2 when a brake application is made.

A U-shaped equalizer lever 6 is disposed between the upper and lower flanges of the brake beam 4 adjacent each end thereof and on the inboard side of the respective guide foot 5 and is pivotally mounted on, such as, a headed pin 7 that extends through suitable coaxial bores provided therefor in these flanges and the respective equalizer lever 6.

A pair of composition type brake shoes 8 and 9 are suitably arranged so as to be in abutting relationship with, such as being secured thereto, the respective opposite ends of each equalizer lever 6 for movement into braking contact respectively with the peripheral surface of a split-type finned brake drum 10 that either may be secured to the inboard side of the respective wheels 1 and 2 by a plurality of studs 11 and nuts 12, only one of each for each wheel being shown in the drawings, or pressed on the axle 3 so as to abut the inboard side of the wheel, and the tread surface of the respective wheel.

The peripheral surface of each brake drum 10, when a brake shoe 8 is forced or pressed thereagainst, enables the mass of the respective brake drum to constitute a heat sink in which heat energy may be stored and from which heat may be dissipated by radiation from the fins formed integral with the drum as the drum rotates.

When a pair of brake beams like the brake beam 4, shown in FIG. 1 of the drawings, constitutes the two brake beams of a brake rigging, such as the brake rigging shown and described in the hereinbefore-mentioned U.S. Pat. No. 2,958,398, the brake shoes 8 and 9 are operated into and out of contact with the peripheral surface of the brake drums 10 and wheels 1, 2 by means of a pair of fluid pressure motors or brake cylinders 13, one secured to each brake beam in a manner now to be described.

The outer ends of the flanges of the cast brake beam 4 are curved through an angle of substantially ninety degrees to form upper and lower ribs 14, only the upper rib appearing in FIG. 1. Formed integral with these ribs 14 is an annular member 14a against which the open end of a cup-shaped body 15 of the brake cylinder 13 abuts, this body 15 being secured to this annular member 14a by a plurality of bolts 16 and nuts 17, three of each appearing in FIG. 1. These bolts 16 extend through coaxial smooth bores provided therefor in an outturned annular flange 18 formed integral with the open end of the body 15, annular member 14a and ribs 14.

Slidably mounted in the body 15 of the brake cylinder 13 is a piston (not shown) that has a push rod 19 that extends through a suitable opening (not shown) in the web of the brake beam 4. The exterior end of the push rod 19 is connected to the other one of the pair of brake beams of the brake rigging. This other one of the brake beams is provided with a brake cylinder, a piston and a push rod that are identical in construction to the brake cylinder 13, piston and push rod described above for the brake beam 4.

The push rod that extends from the brake cylinder carried by the other one of the pair of brake beams is indicated in FIG. 1 of the drawings by the numeral 20. The outer end of this push rod 20 extends through a suitable opening (not shown) in the web of the brake beam 4, and adjacent this outer end this push rod 20 is provided with a smooth bore (not shown) that is coaxial with coaxial smooth bores (not shown) in the upper and lower flanges of the brake beam 4. A headed pin 21 extends through these coaxial bores to operatively connect this push rod 20 to the brake beam 4.

The piston within the cup-shaped body 15 of the brake cylinder 13 cooperates with the closed end of this body 15 to form a pressure chamber (not shown) to which fluid under pressure may be supplied through a passageway 22 extending through this body 15, one end of this passageway opening into this pressure chamber and the other end opening at a bolting face 23 formed on the exterior of this body 15 at the closed end thereof.

OPERATION — FIG. 1

In operation, when it is desired to effect a fluid pressure brake application, fluid under pressure is admitted simultaneously to the pressure chamber in each of the brake cylinders 13 carried by each one of the two brake beams of the brake rigging, it being understood that each of these brake beams is the same in construction as the brake beam 4 shown in FIG. 1 of the drawings, through a flexible hose and hose fitting (not shown) connected at one end to each of the passageways 22 and at the other end to the brake control valve device of the usual air brake system on railway vehicles. Fluid under pressure thus supplied to the pressure chamber in each brake cylinder 13 is effective to move the pistons and cylinders 13 in opposite directions. As the pistons and cylinders 13 are moved in opposite directions, the two brake beams, each being the same in construction as the beam 4, also move in opposite directions since the piston of one brake cylinder 13 carried by one brake beam is connected through one push rod 19 to the other brake beam and the piston of the other brake cylinder 13 carried by the other brake beam is connected through the other push rod 20 to the one brake beam. As the brake beams move in opposite directions, the brake shoes 8 and 9 carried by the beams are brought into braking contact with the respective peripheral surface of the corresponding brake drum 10 and wheels 1 and 2.

As these brake beams are moved, as described above, these beams are supported and guided by the guide feet 5 as these feet have sliding contact in the grooves in the wear plate and guide members. The orientation of the wear plate and guide members is such that the brake beams and the brake shoes 8 and 9 carried thereby are moved radially toward the corresponding brake drum 10 and wheels 1 and 2.

It will be understood that in view of the symmetrical disposition of the brake cylinders on the two brake beams each on opposite sides of the longitudinal axis of the railway vehicle truck and the corresponding symmetrical relation of the points at which the piston rods are anchored to the two brake beams, the simultaneous supply of fluid at the same pressure to the pressure chambers of both brake cylinders 13 produces substantially equalized forces of application of the brake shoes 8 and 9 to the corresponding brake drums 10 and wheels 1 and 2.

When it is desired to release the brake application, the fluid under pressure supplied to the pressure chamber of both brake cylinders 13 is vented in the usual manner to atmosphere through the passageways 22 and the flexible hoses under the control of the usual brake control valve device of the vehicle brake system, whereupon the force of each release spring (not shown) acting on the non-pressure head (not shown) moves the corresponding brake cylinder 13 and its piston in a brake releasing direction to move the brake beams toward each other and the brake shoes 8 and 9 correspondingly away from the peripheral surface of the brake drums 10 and wheels 1 and 2 to effect a brake release.

Due to the inclination of the grooves in the wear plate and guide members, the brake beams tend to return by action of gravity to their normal symmetrical relation with respect to the truck bolster (not shown), in which position the clearance between the brake shoes on one brake beam and their associated brake drums and wheels is substantially equal to the clearance between the brake shoes on the other brake beam and their associated brake drum and wheels.

Now let it be supposed that, while a brake application is in effect, one of the brake shoes begins to wear away faster than the others.

First, let it be supposed that the brake shoe 9 shown on the right-hand side of FIG. 1 wears away faster than the right-hand brake shoe 8. As this brake shoe 9 begins to wear away faster than the above-mentioned brake shoe 8, the force transmitted from the brake beam 4 to the right-hand pin 7 is, in turn, transmitted to the right-hand equalizer lever 6 to cause this lever 6 to rock counterclockwise and thereby maintain the brake shoe 9 in contact with the peripheral tread surface of the wheel 2.

The force transmitted from the pin 7 through the equalizer lever 6 to the two shoes 8 and 9 will now press each shoe against its corresponding braking surface with substantially the same force being transmitted by each shoe to the braking surface against which it is pressed.

In view of the foregoing, it is apparent that substantially the same braking force is transmitted by each of the brake shoes 8 and 9 to its corresponding braking surface as the brake shoe 9 wears away as was the case prior to the brake shoe 9 beginning to wear away.

Now let it be supposed that the brake shoe 8 shown on the right-hand side of FIG. 1 wears away faster than the right-hand brake shoe 9. As this brake shoe 8 begins to wear away faster than the brake shoe 9, the force transmitted from the brake beam 4 to the right-hand pin 7 is in turn transmitted to the right-hand equalizer lever 6 to cause this lever 6 to rock clockwise and thereby maintain the brake shoe 8 in contact with the peripheral surface of the right-hand brake drum 10.

The force transmitted from the pin 7 through the equalizer lever 6 to the two right-hand brake shoes 8 and 9 will now press each of these brake shoes against its corresponding braking surface with substantially the same force being transmitted by each shoe.

In view of the foregoing, it is apparent that substantially the same braking force is transmitted to each of the brake shoes 8 and 9 as the brake shoe 8 wears away as was the case prior to this brake shoe 8 beginning to wear away.

It will be observed from FIG. 1 of the drawing that the length of the left-hand arm of the right-hand equalizer lever 6 is shown somewhat shorter than the length of the right-hand arm of this lever. Accordingly, the force applied by the brake shoe 8 to the peripheral surface of the right-hand brake drum 10 will be greater than the force applied to the peripheral tread surface of the wheel 2.

Since brake horsepower is a function of the braking force applied to a rotating element, such as a brake drum or a wheel, and the temperature rise in the element increases as the brake horsepower applied thereto increases, it is apparent that the brake shoe 8, since it transmits a greater braking force to the brake drum 10 than the brake shoe 9 transmits to the wheel 2, will convert more mechanical energy into heat energy that is stored in and dissipated from the mass constituting the rotating finned brake drum 10 than the brake shoe 9 will cause to be stored in and dissipated from the mass constituting the rotating wheel 2.

If the length of the left-hand arm of the right-hand equalizer lever 6 be made longer than that of the right-hand arm of this lever, it is apparent from the foregoing that the heat energy stored in and dissipated from the mass constituting the rotating wheel 2 will be a preselected ratio of the heat energy stored in and dissipated from the mass constituting the finned brake drum 10.

Accordingly, when the total brake horsepower per wheel of a railway vehicle truck has been determined and the mass of the wheel is known, which of course, is determined from the size, diameter, and kind of wheel to be used on the truck, the amount of brake horsepower that can be converted from mechanical energy to heat energy and absorbed by this wheel without over heating can be determined. The length of the arms of the equalizer lever 6 and the size of the brake drum 10 may then be so selected that the remaining amount of the total brake horsepower per wheel, when converted from mechanical energy into heat energy, can be stored in and dissipated by radiation from the brake drum 10 without the resulting temperature of this brake drum 10 being in excess of a safe limit.

What has been said above regarding the right-hand equalizer lever 6 and the brake shoes 8 and 9 carried thereby, the right-hand brake drum 10 and wheel 2 applies equally to the left-hand equalizer lever 6, the brake shoes 8 and 9 carried thereby, the wheel 1, and the left-hand brake drum 10 secured to this wheel 1. Therefore, a detail description of the left-hand equalizer lever 6, brake shoes 8 and 9 carried thereby, the wheel 1 and drum 10 secured thereto is believed to be unnecessary.

It will be noted that it is not necessary to use a slack adjuster with a brake rigging comprising a pair of brake beams constructed like the brake beam 4 shown in FIG. 1 of the drawings. Since there are no links or levers between each of the brake cylinders and the brake beams constructed in accordance with the present invention, there can be no wear therein which must be compensated for by a slack adjuster as in conventional brake rigging. It should be understood that the length of the bore in the body 15 of the cylinders 13 is such as to provide sufficient travel for the pistons in addition to that required to effect contact of the brake shoes 8 and 9 with the peripheral surface of the brake drums 10 and the tread surface of the wheels 1 and 2, that, as these brake shoes wear away, the shoes are always properly moved into braking contact with the wheels of the truck during each brake application throughout their useful life without the necessity of a slack adjuster to compensate for wear of the shoes 8 and 9.

DESCRIPTION — FIG. 2

Figure 2:
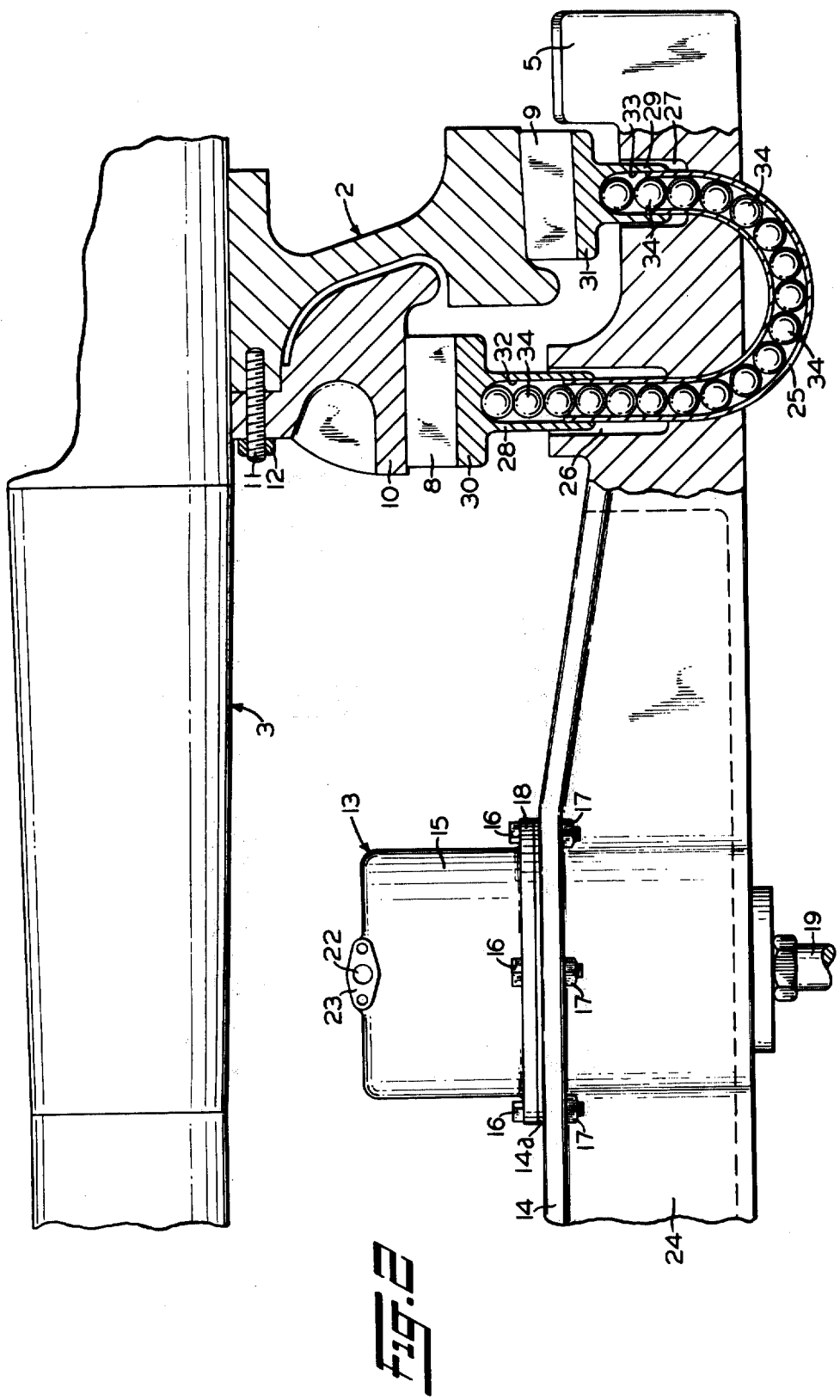
FIG. 2 is a plan or top view, partly in section, of a brake apparatus which embodies another form of the invention.

The second embodiment of the invention shown in FIG. 2 of the drawings discloses a brake beam 24 that is substantially identical to the brake beam 4 shown in FIG. 1 except for the structure by which the brake shoes 8 and 9 are carried by this brake beam 24. Other elements shown in FIG. 2 which are the counterparts of the elements shown in FIG. 1 are identified by the same reference numerals as in FIG. 1 without further description. The brake beam 24 may be in the form of a casting that, except for a portion extending inward from each end thereof, has the shape of a standard channel, such as a U-channel, which has an upper and a lower flange that are connected by a web that is integral therewith. At each end of the brake beam 24, a guide foot 5, in the form of a flat L-shaped member, has one leg thereof cast integral with the respective end of the beam. It will be understood that the other leg of each guide foot 5 is slidably supported in a grooved wear plate and guide member (not shown) in the same manner as the guide feet 5 of the brake beam 4 shown in FIG. 1.

As shown in FIG. 2, that portion of the brake beam 24 that extends between the right-hand end of the U-channel and the guide foot 5 has embedded therein, when the brake beam is cast, a U-shaped tubular member 25 that is made from a high melting point steel tubing in order that this tubular member 25 is not distorted by hot molten metal flowing around it in the mold in which the brake beam 24 is cast. It will be noted from FIG. 2 that the respective opposite ends of the tubular member 25 are disposed in a pair of cavities 26 and 27 provided therefor in the beam 24. These cavities 26 and 27 are square in cross section and of sufficient size as to provide ample clearance to prevent sliding contact between the wall surface thereof and the outside surface of the corresponding square shank 28 and 29 of brake heads 30 and 31 that carry the respective brake shoes 8 and 9, as shown in FIG. 2.

The square shanks 28 and 29 are hollow in that they are provided respectively with bottomed bores 32 and 33 which enable shank 28 to be slidably mounted on the left-hand end of the tubular member 25 and the shank 29 to be slidably mounted on the right-hand end of this member.

As shown in FIG. 2, the interior of the tubular member 25 and the interior of the bottomed bores 32 and 33 are filled with a plurality of abutting spheres or balls 34 constructed of, for example, steel. These balls 34 serve to transmit a braking force from the brake beam 24 to the brake shoes 8 and 9 when a pair of brake beams, each constructed as brake beam 24, of a brake rigging are moved in opposite directions in the manner hereinbefore described for a brake rigging comprising a pair of brake beams constructed as brake beam 4 shown in FIG. 1.

The plurality of balls 24 shown in FIG. 2 serve the same purpose as the equalizer levers 6 shown in FIG. 1 in that they insure equal forces on the brake shoes 8 and 9 notwithstanding wear.

It will be understood that the left-hand end (not shown) of the brake beam 24 is provided with a tubular member 25, a plurality of balls 24, and a pair of brake heads 30 and 31 having shanks 28 and 29 and carrying brake shoes 8 and 9.

Having now described the invention what I claim as new and desire to secure by Letters Patent, is:

1. In combination:
   a. a rotatable member to be braked constituting a mass that has formed thereon a plurality of peripheral annular braking surfaces, wherein the improvement comprises:
   b. a plurality of brake shoes, each effective to transmit a braking force to a corresponding one of said plurality of peripheral annular braking surfaces upon movement into braking engagement therewith, the mechanical energy of said braking force being converted to heat energy that is stored in and dissipated from that portion of said mass of said rotatable member on which the corresponding peripheral annular braking force is formed, and
   c. means so cooperating with said plurality of brake shoes that, upon said means being moved in one direction, each of said plurality of brake shoes is brought into braking contact with the corresponding one of said plurality of peripheral annular braking surfaces and, upon said means being moved in an opposite direction, each of said plurality of brake shoes may be moved out of braking contact with said corresponding braking surfaces, by the action of gravity,
   d. said rotatable member to be braked comprising:
      i. at least one element having a preselected mass on which a certain one of said plurality of peripheral annular braking surfaces is formed,
      ii. at least one other element having a different preselected mass on which another one of said plurality of peripheral annular braking surfaces is formed, said at least one other element being rotatable with said at least one element, and
   e. said means cooperating with said plurality of brake shoes comprising:
      i. a first movable means,
      ii. a second means carried by and rockable with respect to said first movable means for so cooperating with at least two of said brake shoes that braking engagement between one of said at least two brake shoes and its corresponding braking surfaces causes the other of said at least two brake shoes to transmit a braking force to its corresponding braking surface that is a preselected ratio of the braking force transmitted by said one of said at least two brake shoes to its corresponding braking surface.

2. The combination, as recited in claim 1, further characterized in that said at least one and said at least one other element of said rotatable member comprise respectively a vehicle wheel, the tread surface of which constitutes the peripheral annular braking surface formed thereon, and a cylindrical brake drum the periphery of which constitutes the annular braking surface thereon.

3. The combination, as recited in claim 1, further characterized in that said first movable means comprises a brake beam, and said second means comprises a plurality of levers each of which is pivotally mounted intermediate its ends on a fulcrum fixed to said brake beam, each end of each lever being effective to move one of said plurality of brake shoes into braking contact with a corresponding braking surface upon movement of said brake beam in said one direction.

4. The combination, as recited in claim 1, further characterized in that said first movable means comprises a brake beam and said second means comprises:
   a. at least one U-shaped tubular member carried by said brake beam and so disposed that its respective opposite ends are in alignment respectively with said certain one and said another peripheral annular braking surfaces,
   b. at least one pair of brake heads each of which carries one of said plurality of brake shoes and is provided with a hollow shank which is slidably mounted on one end of said at least one U-shaped tubular member, and
   c. a plurality of spherical members disposed in abutting relationship in said at least one U-shaped tubular member and said shanks of said brake heads, said spherical members being effective, in response to wear of the brake shoe carried by either one of said pair of brake heads, to cause the braking force transmitted by each brake shoe to its corresponding braking surface to be substantially equal to that transmitted by the other brake shoe.

5. In combination:
   a. a rotatable member to be braked comprising:
      i. a railway vehicle truck axle,
      ii. a pair of railway vehicle wheels secured to the respective opposite ends of said axle, each wheel having a tread surface that constitutes a peripheral annular braking surface thereby enabling the mass of the wheel to constitute a first heat sink for the storage of heat energy therein, and
      iii. a pair of brake drums, one associated with each of said wheels and having a peripheral annular braking surface thereby enabling the mass of the respective drum to constitute a second heat sink for the storage of heat energy therein, b. a plurality of brake shoe means effective when pressed against a corresponding peripheral annular braking surface to transmit brake horsepower thereto to cause the conversion of mechanical energy into heat energy for storage in said first and second heat sinks constituted by the respective masses of said wheels and brake drums, c. a brake beam movable toward and away from said rotatable member to be braked, and d. a plurality of levers each of which at each of its respective opposite ends abuts one of said plurality of brake shoe means and is so pivotally mounted intermediate its said opposite ends on a fulcrum fixed to said brake beam that movement of said brake beam in the direction of said rotatable member is effective to bring the brake shoe means abutting one end of each of said levers into braking contact with the braking surface on one of said vehicle wheels and the brake shoe means abutting the other end of each of said levers into braking contact with the braking surface on one of said brake drums, said levers enabling each brake shoe means to transmit substantially the same braking force to its corresponding braking surface as the other brake shoe means notwithstanding the rate of wearing away of either brake shoe means exceeding that of the other.

6. The combination, as recited in claim 5, further characterized in that said brake beam comprises:

a. a cast brake beam movable toward and away from said rotatable member, b. a plurality of hollow spaced-apart U-shaped tubular members imbedded in said cast brake beam, each so disposed that its respective opposite ends are in alignment respectively with one of said vehicle wheels and one of said brake drums, c. a plurality of brake heads each of which carries one of said plurality of brake shoe means and is provided with a hollow shank, the hollow shanks of each pair of brake heads being slidably mounted on the respective opposite ends of one of said plurality of spaced-apart U-shaped tubular members thereby enabling movement of the brake shoe means carried by each brake head into braking contact with a corresponding braking surface upon movement of said brake beam toward said rotatable member, and d. a plurality of spherical members disposed in abutting relationship in each of said plurality of hollow U-shaped tubular members and the hollow shanks of the pair of brake heads mounted on the respective opposite ends thereof, said spherical members being effective, in response to the rate of wear of the brake shoe means carried by one brake head of said pair exceeding the rate of wear of the brake shoe means carried by the other brake head, to cause the braking force transmitted by each brake shoe means to its corresponding braking surface to be equal to that transmitted by the other of said pair of brake shoe means.

7. The combination, as recited in claim 6, further characterized in that each of said plurality of spaced-apart tubular members is formed by bending a chosen length of high melting-point steel tubing to a chosen configuration prior to casting said brake beam.

8. The combination, as recited in claim 6, further characterized in that said brake beam comprises:

a. a flat web having longitudinal flanges at opposite edges thereof to form a U-shaped channel, b. a longitudinally extending rib integral with each flange on the side thereof opposite said web, c. an annular member formed integral with said ribs and extending outward therefrom, said annular member being provided with a plurality of arcuately-spaced bores, and d. a brake cylinder body having at one end an outturned annular flange disposed in abutting relationship with said annular member, said outturned flange being provided with a plurality of arcuately-spaced bores coaxial with said bores in said annular member, and e. means extending through said coaxial bores in said annular member and said outturned flange for rigidly securing said brake cylinder body to said annular member.

9. The combination, as recited in claim 8, further characterized in that said cast brake beam has cast integral therewith as each end thereof a guide foot, said guide feet enabling the support of said brake beam with respect to said rotatable member whereby said brake beam may be moved toward and away from said pair of railway vehicle wheels.

10. The combination, as recited in claim 8, further characterized in that each of said pair of brake drums is removably secured to one of said pair vehicle wheels, and each wheel and brake drum carried thereby constituting a pair of heat sinks for the storage of heat energy converted from mechanical energy resulting from the respective brake shoe being pressed against its corresponding braking surface.

11. Multi-brake shoe means for transmitting braking force to braking surfaces formed respectively on a pair of wheels mounted in spaced-apart relation on a common axle and on a pair of brake drums mounted respectively on said pair of wheels, said multi-brake shoe means comprising:

a. a member movable toward and away from said braking surfaces on said wheels and drums, b. a plurality of brake shoes for transmitting braking force to said braking surfaces, and, wherein the improvement comprises:

c. at least one means mounted intermediate its ends on said movable member, each end of said at least one means being effective to move at least one of said brake shoes therewith upon movement of said member toward said multi-braking surfaces, further characterized in that said at least one means comprises:

I. a hollow U-shaped tubular member rigidly carried by said movable member,

II. a plurality of pairs of brake heads, each brake head carrying one of said plurality of brake shoes and having a hollow shank slidably mounted on one end of said hollow U-shaped tubular member, and III. a plurality of spherical members disposed in abutting relationship within said hollow U-shaped tubular member and said hollow shank to enable said movable member to transmit equal braking forces to the multi-braking surfaces on the element to be braked via said spherical members, said brake heads and said brake shoes carried thereby notwithstanding unequal wear of said brake shoes.

12. Multi-brake shoe means, as recited in claim 11, further characterized in that the opposite ends of a U-shaped line coaxial with the axis of said at least one hollow U-shaped tubular member lies in a plane that is perpendicular to and passes through a corresponding one of said braking surfaces midway the width thereof.

13. Multi-brake shoe means for transmitting braking force to braking surfaces formed respectively on a pair of wheels mounted in spaced-apart relation on a common axle and on a pair of brake drums mounted respectively on said pair of wheels, said multi-brake shoe means comprising:
   a. a member movable toward and away from said braking surfaces on said wheels and drums,
   b. a plurality of brake shoes for transmitting braking force to said braking surfaces, and, wherein the improvement comprises:
   c. at least one means mounted intermediate its ends on said movable member, each end of said at least one means being effective to move at least one of said brake shoes therewith upon movement of said member toward said multi-braking surfaces, further characterized in that said at least one means comprises at least one lever that at each of its respective opposite ends abuts at least one of said plurality of brake shoes, said at least one lever being so pivotally mounted intermediate its ends on a fulcrum fixed to said movable member as to provide, upon movement of said member toward said multi-braking surfaces, for the transmission to the brake shoe abutting one end of said at least one lever a braking force that is a preselected multiple of the braking force transmitted to the brake shoe abutting the other end irrespective of the rate of wear of one brake shoe exceeding the rate of wear of the other brake shoe.

14. Multi-brake shoe means, as recited in claim 13, further characterized in that said at least one lever is so pivotally mounted intermediate its ends on a fulcrum fixed to said movable member as to provide said lever with two oppositely extending arms of unequal length, each of said arms at its exterior end being in abutting relationship with one of said plurality of brake shoes to which the respective arm may transmit a braking force that is inversely proportional to the length of this respective arm.

* * * * *